June 24, 1969

H. G. FREY ETAL 3,451,272

BAROMETER MOVEMENT

Filed Sept. 18, 1967

INVENTORS
HUBERTUS G. FREY
EDWARD F. CIELASZYK by: Wolfe, Hubbard, Voit & Osann
ATTYS.

INVENTORS
HUBERTUS G. FREY
EDWARD F. CIELASZYK by: Wolfe, Hubbard, Voit & Osann
ATTYS.

United States Patent Office 3,451,272
Patented June 24, 1969

3,451,272
BAROMETER MOVEMENT
Hubertus G. Frey, Peru, and Edward F. Cielaszyk, Oglesby, Ill., assignors to General Time Corporation, Stamford, Conn., a corporation of Delaware
Filed Sept. 18, 1967, Ser. No. 668,351
Int. Cl. G01l 7/12
U.S. Cl. 73—387                                13 Claims

ABSTRACT OF THE DISCLOSURE

A barometer movement having a bellows mounted in a U-shaped spring and a single amplifying lever for transmitting movement of the bellows to the indicating means and with provision for varying the amplification ratio.

---

It is an object of the present invention to provide a barometer movement which is simple and inexpensive but which has a high order of accuracy and low residual friction to provide prompt and accurate response to minor changes in barometric pressure. It is a related object to provide a barometer movement which is highly compact having a minimum number of parts but which is easily assembled and adjusted and which provides for precise adjustment of the amplification ratio thereby to achieve accurate tracking of the indicator with respect to a printed scale.

Other objects and advantages of the invention will become apparent upon reading the attached detailed description and upon reference to the drawings in which.

Figure 1:
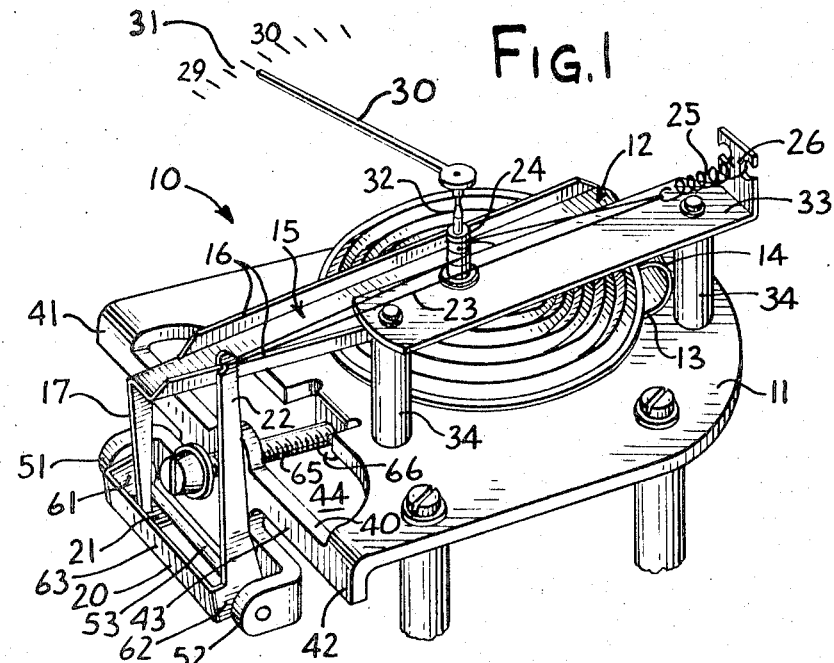
FIGURE 1 is a perspective view of a barometer movement constructed in accordance with the present invention.
Figure 2:
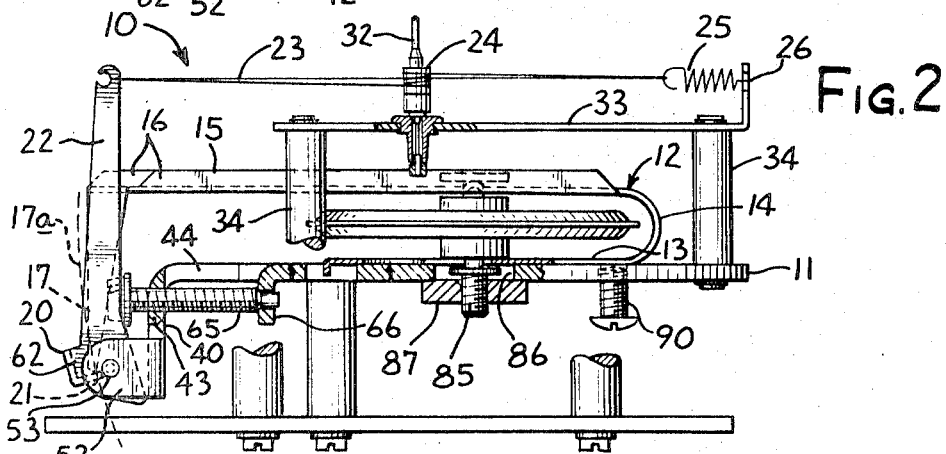
FIG. 2 is a side elevation of the movement shown in FIG. 1.
Figure 3:
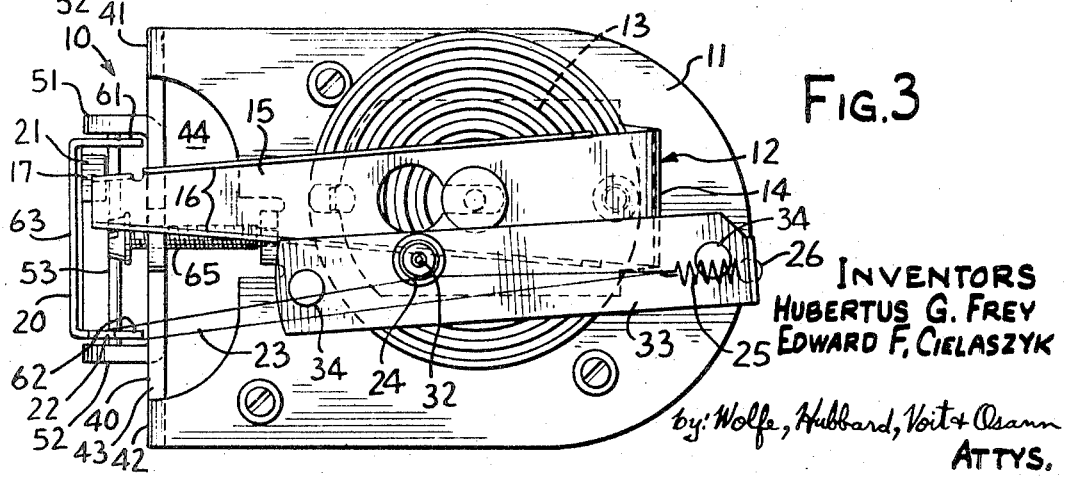
FIG. 3 is a plan view of the barometer movement.

While the invention will be described in connection with a preferred embodiment, it will be understood that we do not intend to be limited to the particular embodiment shown but intend on the contrary to cover the various alternative and equivalent constructions included within the spirit and scope of the appended claims.

Turning now to the drawings there is disclosed a barometer movement 10 having a flat frame or base plate 11. Mounted on top of the plate is a U-shaped leaf spring 12 having a base portion 13, a reversely bent portion 14 and an arm portion 15. The arm portion is elongated and has upwardly bent edges 16 extending the length thereof for the purpose of providing longitudinal rigidity and terminates in a tip 17. Pocketed in the spring is a sealed bellows of disc shape so that the tip 17 moves upwardly and downwardly as the bellows expands and contracts incident to changes in atmospheric pressure, the bellows being indicated at 18.

In accordance with the present invention a single amplifying lever is provided having a short arm and a long arm extending at right angles to one another, with the short arm being arranged squarely in the path of movement of the tip 17 of the leaf spring and with the long arm being connected to a thread wound about an indicator spindle and with a take-up spring for maintaining tension in the thread and biasing the lever to maintain bottoming contact with the tip of the leaf spring, together with means for adjustably changing the spacing between the lever axis and the centerline of the bellows. More specifically in accordance with the invention the lever is pivoted on a bracket which is mounted upon a deformable bridge forming a part of the base plate with means for controlling the degree of deformation and thus varying the lateral position of the lever axis for adjustment of the amplification ratio. As shown in the drawing, the amplifying lever, indicated at 20, has a short arm 21 which is generally parallel to the base plate and a long arm 22 arranged at right angles thereto. The short arm is positioned squarely in the path of movement of the tip 17 of the bellows spring, which is relatively sharp for localized contact, while the long arm is connected to a thread 23 which is wound about a spindle 24 and which terminates in a take-up spring 25 which is anchored with respect to the base plate at 26. The spindle 24 drives an indicating hand or pointer 30 which cooperates with a printed scale 31, the hand being connected to the spindle by means of a shaft 32. The take-up spring 25 places the thread 23 under light tension to accommodate thread movements as well as to insure that the amplifying lever is biased in a direction, clockwise as shown, to maintain the short arm 21 of the lever constantly bottomed upon and lightly biased against the tip 17 of the spring. The spindle may be conveniently pivoted on a bridge 33 mounted on pillars 34 to overlie the bellows and with the spindle at the same height as the upper end of the long arm 22 of the amplifying lever.

For the purpose of varying the effective length of the short lever arm 21 on the lever, provision is made for finely adjusting the lateral position of the lever axis. This is brought about, according to the present invention, by pivotally mounting the lever on a bracket which in turn is secured to a deformable bridge on the frame plate with an adjusting screw for varying the degree of deformation. Thus, as shown in the drawing, a bridge indicated at 40, having ends 41, 42 and a central portion 43 is defined by cutting a D-shaped opening 44 at one end of the base plate and by bending the end of the plate downwardly at right angles. Secured to the central portion of the bridge 40 is a bracket 50 having ends 51, 52 which are bent over to define pivot points which are widely spaced and alined with one another for reception of a pivot pin 53. For the purpose of engaging the pivot pin at correspondingly widely spaced points, the lever 20 has bent-over end tabs forming pivots 61, 62 joined by an axially extending central portion 63. Conveniently the short arm 21 is formed by a bent-over tab which is integral with the portion 63 of the lever, while the longer arm 22 is made integral with the portion 62. The widely spaced pivot points provide lateral stability enabling the two arms 21, 22 to be conveniently spaced from one another along the pivot axis and avoiding any tendency toward binding. This enables the thread 23 which transmits the movement to be arranged side-by-side with respect to the arm 15 of the bellows spring and well spaced from it to provide a construction which is open and easily accessible yet inherently compact. A high amplification ratio with only a limited overhead clearance requirement is achieved by locating the lever pivot axis 53, as shown, substantially below the level of the base plate and by elongating the tip 17 on the leaf spring so that it extends downwardly, generally parallel to the long arm 22 of the lever.

For varying the degree of lateral deformation of the bridge 40, an adjusting screw 65 is provided which is threaded into the center of the bridge and which engages a downwardly bent tab 66 integrally formed in the base plate. It will be apparent that by screwing in the screw against the tab the bridge 40 is bowed laterally outward, thus moving the lever axis outwardly or to the left as viewed in the drawing. This tends to move the point of contact of the tip 17 on the bellows spring closer to the lever axis. Since the length of the longer lever arm 22 is unaffected by this motion, the effect is to increase the amplification ratio with a fine degree of control. Conversely, upon unscrewing the screw 65, permitting the bridge to approach the body of the base plate, the effective length of the short lever arm 21 is increased, thereby to reduce the amplification ratio. Since the change in ratio may be achieved with precision by the screw 65, the indicating hand 30 may be caused to accurately track the graduations of the scale 31 over the useful range permitting an inexpensive printed scale to be used.

Figure 4:
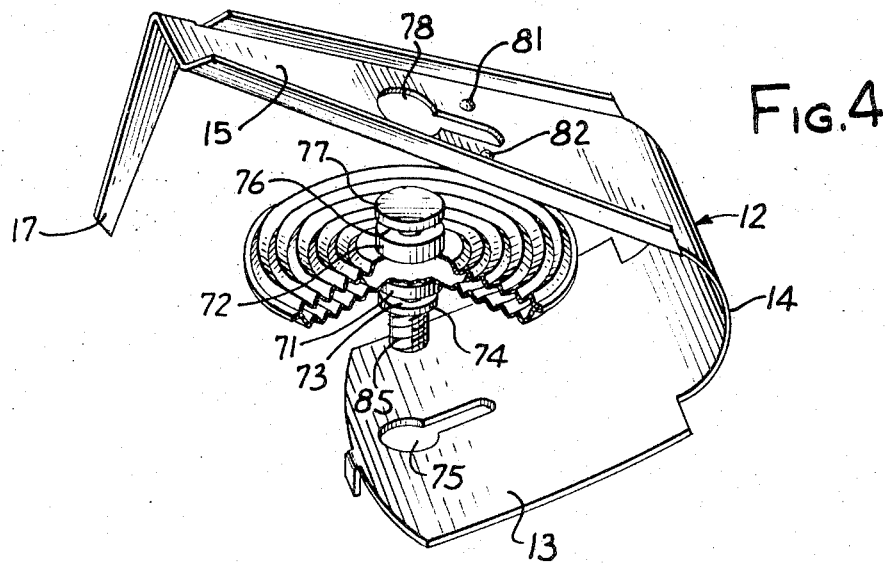
FIG. 4 is a fragmentary view showing assembly of the bellows into engagement with the leaf spring to form a subassembly.

In accordance with one of the aspects of the present invention novel means are provided for assembling the bellows 18 and the U-shaped spring 12 which surrounds it in order to form a convenient subassembly which includes a well defined fulcrum between the members. Thus, referring particularly to FIGS. 4 and 5, the bellows 18 is provided on opposite sides with alined pedestals 71, 72 which are necked down to engage keyhole-shaped openings in the base and arm portions respectively of the bellows spring 12. First, pedestal 71 is necked at 73 to define an enlargement 74 which engages a keyhole-shaped opening 75 in the base of the spring. Similarly the pedestal 72 is necked at 76 to provide an enlargement 77 which is insertable into a keyhole-shaped opening 78. During assembly, the spring 12, which is prestressed outwardly, is compressed so that the enlargements 74, 77 may enter the enlarged ends of the keyhole openings. When this is done the bellows unit may be simply slid into the root ends of the keyhole openings following which the spring may be released, holding the bellows captive. The spring thereafter provides outwardly directed forces on the opposite sides of the bellows to overcome the compressive effect of atmospheric pressure. In order to reduce the friction between the bellows and leaf spring which might affect the responsiveness of the spring in the face of small changes in atmospheric pressure, i.e., to produce a well defined fulcrum, the arm 15 of the spring is provided with a pair of transversely alined dimples which define projections 81, 82 on opposite sides of the root portion of the keyhole-shaped opening 78. With the underside of the enlargement 77 made relatively flat, contact is localized along a well defined axis over the entire effective stroke of the bellows.

For the purpose of mounting the assembled bellows and leaf spring at a concentrated region on the base plate while permitting a coarse lateral adjustment, the lower pedestal of the bellows terminates in a stud 85 which projects through an elongated slot 86 in the base plate and which carries a large hex clamping nut 87. To limit the degree of gross adjustment of the bellows-spring combination with respect to the plate, the base portion of the spring is formed with an integral tab 88 which registers with an enlarged opening 89 in the plate. Thus, when the bellows-spring assembly is installed on the base plate, the assembly is moved backwardly or forwardly to a "factory set" position, which may be facilitated by use of an appropriate jig, and then the nut 87 is securely tightened to hold the assembly in position. Following this a further or fine adjustment is achieved by the deformable bridge as previously described.

Figure 5:
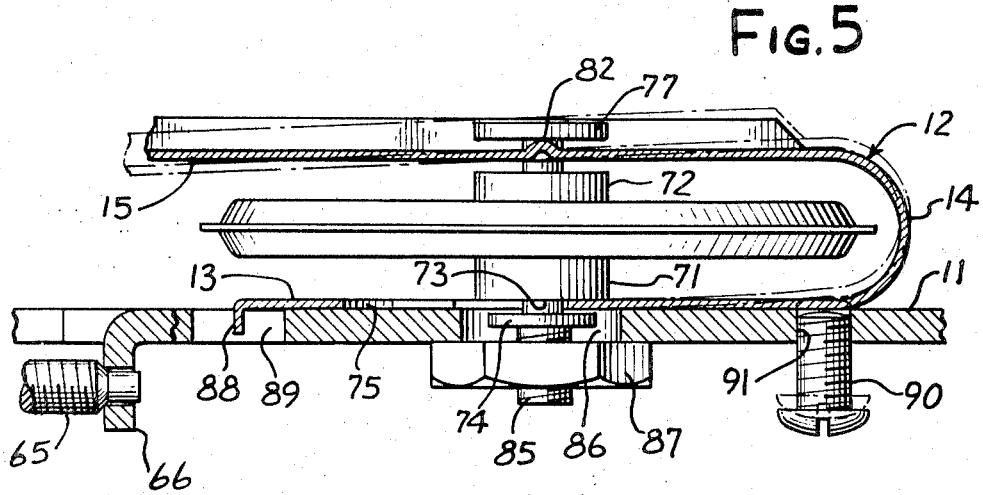
FIG. 5 is an enlarged fragmentary section taken through the pedestals of the bellows with the bellows, leaf spring and base plate assembled together.

In order to achieve a ground level or reference adjustment of the indicating hand 30 with respect to the scale 31, a setting screw 90 is provided which engages an opening 91 in the frame plate and the tip of which bears against the base portion of the leaf spring adjacent its bent portion 14. This tends to rock the spring more or less bodily with respect to its bellows so as to change the deflected position of the tip 17 of the spring for a given atmospheric pressure as shown in FIG. 5.

Figure 6:
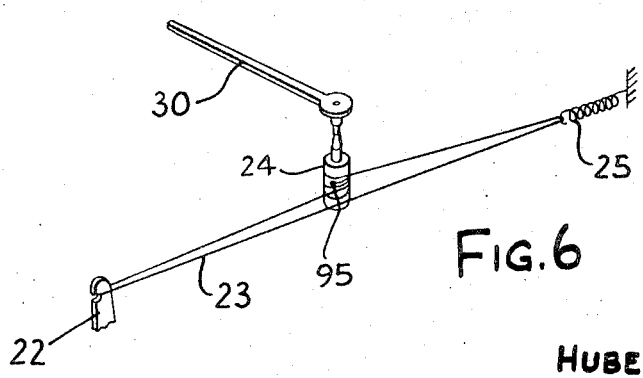
FIG. 6 is a fragmentary perspective showing the preferred run of thread for transmitting movement to the spindle.

In order to adjust the intial phasing of the pointer for a given position of the amplifying lever, the thread 23 is preferably made in the form of an endless loop as indicated in FIG. 6, with both ends of the thread being anchored in the spindle and with the run of the loop being hooked onto the arm 22 of the lever and to the end of the take-up spring 25 as shown. The bitter ends of the thread may be suitably secured in a transverse opening 95 formed in the spindle. It will be understood, then, that in the initial or factory adjustments the loop of thread is relatively slid through the points of hooking accompanied by rotation of the spindle and its indicating pointer under the desired initial condition is achieved. This adjustment, once made, does not tend to change during the life of the instrument.

While the construction is simple and inexpensive, it is found that the sensitivity and small amount of residual friction corresponds to that achieved in much more costly movements. Not only is there minimum friction between the bellows and leaf spring because of the well defined fulcruming between them, but the point contact engagement between the tip of the spring and the short arm of the lever, combined with the widely spaced pivot points, minimizes friction or binding elsewhere in the system. Friction at the spindle may be reduced to an acceptable level by a simple sleeve type of bearing without necessity for resorting to use of jewels.

By spacing the lever pivot axis substantially below the level of the base plate and by providing an elongated tip on the leaf spring which is parallel to, but laterally spaced from, the long arm 22 of the lever, compactness is achieved combined with good spacing of the parts and ease of access should service or adjustment become necessary.

The present movement may be universally used in many different designs and sizes of barometers, or as an altimeter movement wherever accurate indication of change in barometric pressure is desired.

In the following claims the term "deformable bridge" is intended to cover any mounting for the amplifying lever, preferably integral with the base plate, which, by its deformation under the action of an adjusting screw or the like, brings about the desired fine adjustment in the lateral position of the lever axis.

We claim as our invention:

1. In a barometer movement the combination comprising a flat base plate, a sealed bellows of disc shape having axial pedestals on the opposite sides thereof, a U-shaped leaf spring having a flat base portion and an elongated arm portion with a tip, said bellows being positioned within the leaf spring with the pedestals respectively coupled to the base portion and arm portion and with the pedestal adjacent the base portion being secured to the base plate, an amplifying lever pivoted to the base plate along one edge thereof, said amplifying lever having a short arm and a long arm extending substantially at right angles to one another, indicating means including a rotatable spindle having a pointer and scale, the long arm of the lever having a thread which is wound about the spindle, the thread having a take-up spring anchored with respect to the base plate, the short arm of the lever being located squarely in the path of movement of the tip of the leaf spring so that movements thereof as the bellows expands and contracts produce amplified rotation at the spindle, and means for varying the effective spacing between the lever axis and the centerline of the bellows for achieving accurate tracking of the pointer with respect to the graduations of the scale.

2. In a barometer movement the combination comprising a flat base plate, a sealed bellows of disc shape having axial pedestals on the opposite sides thereof, a U-shaped leaf spring having a flat base portion and an elongated arm portion with a tip, said bellows being positioned within the leaf spring with the pedestals respectively coupled to the base portion and arm portion and with the pedestal adjacent the base portion being secured to the base plate, an amplifying lever pivoted to the base plate along one edge thereof, said amplifying lever having a short arm and a long arm extending substantially at right angles to one another, indicating means including a rotatable spindle having a pointer and scale, the long arm of the lever having a thread which is wound about the spindle, the thread having a take-up spring anchored with respect to the base plate, the short arm of the lever being located squarely in the path of movement of the tip of the leaf spring so that movements thereof as the bellows expands and contracts produce amplified rotation at the spindle, the base plate being cut out to define a narrow deformable bridge, the lever being pivoted to the bridge and said bridge and frame plate having an interposed adjusting screw to deform the bridge with respect to the body of the frame thereby to move the point of engagement of the tip of the U-shaped spring along the short arm of the lever for precise variation of amplification ratio.

3. In a barometer movement the combination comprising a flat base plate, a sealed bellows of disc shape having axial pedestals on the opposite sides thereof, a U-shaped leaf spring having a flat base portion and an elongated arm portion with a tip, said bellows being positioned within the leaf spring with the pedestals respectively coupled to the base portion and arm portion and with the pedestal adjacent the base portion being secured to the base plate, an amplifying lever pivoted to the base plate along one edge thereof, said amplifying lever having a short arm and a long arm extending substantially at right angles to one another, indicating means including a rotatable spindle having a pointer and scale, the long arm of the lever having a thread which is wound about the spindle, the thread having a take-up spring anchored with respect to the base plate, the short arm of the lever being located squarely in the path of movement of the tip of the leaf spring so that movements thereof as the bellows expands and contracts produce amplified rotation at the spindle, the base plate being relieved to define an integral deformable bridge, a lever-supporting bracket connected to the center of the bridge for mounting the lever, and an adjusting screw at the center of the bridge for deforming the bridge thereby to vary the effective length of the short lever arm for tailoring the relative movement of the pointer to the graduations of the scale.

4. In a barometer movement the combination comprising a flat base plate, a sealed bellows of disc shape having axial pedestals on the opposite sides thereof a U-shaped leaf spring having a flat base portion and an elongated arm portion with a tip, said bellows being positioned within the leaf spring with the pedestals respectively coupled to the base portion and arm portion and with the pedestal adjacent the base portion being secured to the base plate, an amplifying lever pivoted to the base plate along one edge thereof, said amplifying lever having a short arm and a long arm extending substantially at right angles to one another, indicating means including a rotatable spindle having a pointer and scale, the long arm of the lever having a thread which is wound about the spindle, the thread having a take-up spring anchored with respect to the base plate, the short arm of the lever being located squarely in the path of movement of the tip of the leaf spring so that movements thereof as the bellows expands and contracts produce amplified rotation at the spindle, the base plate being provided with a deformable bridge having a bracket secured to the center thereof, said bracket providing widely spaced alined pivot points, and said lever having widely spaced and alined pivots for engaging the same, said bridge having means including an adjusting screw bearing against the base plate for flexing the bridge and thereby adjustably moving the pivot axis of the lever with respect to the tip of the leaf spring to vary the amplification ratio of the lever.

5. In a barometer movement the combination comprising a flat base plate, a sealed bellows of disc shape having axial pedestals on the opposite sides thereof, a U-shaped leaf spring having a flat base portion and an elongated arm portion with a tip, said bellows being positioned within the leaf spring with the pedestals respectively coupled to the base portion and arm portion and with the pedestal adjacent the base portion being secured to the base plate, an amplifying lever pivoted to the base plate along one edge thereof, said amplifying lever having a short arm and a long arm extending substantially at right angles to one another, indicating means including a rotatable spindle having a pointer and scale, the long arm of the lever having a thread which is wound about the spindle, the thread having a take-up spring anchored with respect to the base plate, the short arm of the lever being located squarely in the path of movement of the tip of the leaf spring so that movements thereof as the bellows expands and contracts produce amplified rotation at the spindle, the base plate being provided with a deformable bridge having a bracket secured thereon, said bracket providing widely spaced, alined pivot points, and said lever having an axially extending portion with bent over tabs at its ends providing widely spaced and alined pivots for engaging the same, the short arm on the lever being in the form of an integral tab on the axially extending portion bent inwardly toward the pivot axis, said bridge having means including an adjusting screw bearing against the base plate for flexing the bridge and thereby adjustably moving the pivot axis of the lever with respect to the tip of the leaf spring to vary the amplification ratio of the lever.

6. In a barometer movement the combination comprising a flat base plate, a sealed bellows of disc shape having axial pedestals on the opposite sides thereof, a U-shaped leaf spring having a flat base portion and an elongated arm portion with a tip, said bellows being positioned within the leaf spring with the pedestals respectively coupled to the base portion and arm portion and with the pedestal adjacent the base portion being secured to the base plate, an amplifying lever pivoted to the base plate along one edge thereof, said amplifying lever having a short arm and a long arm extending substantially at right angles to one another, indicating means including a rotatable spindle having a pointer and scale, the long arm of the lever having a thread which is wound about the spindle, the thread having a take-up spring anchored with respect to the base plate, the short arm of the lever being located squarely in the path of movement of the tip of the leaf spring so that movements thereof as the bellows expands and contracts produce amplified rotation at the spindle, the pedestals on the sealed bellows each having a narrow neck terminating in an enlargement, the leaf spring being prestressed outwardly, and the base and arm portions of the spring having keyhole-shaped openings for captive engagement of the pedestals on the bellows with the spring in its compressed state to form a subassembly.

7. In a barometer movement the combination comprising a flat base plate, a sealed bellows of disc shape having axial pedestals on the opposite sides thereof, a U-shaped leaf spring having a flat base portion and an elongated arm portion with a tip, said bellows being positioned within the leaf spring with the pedestals respectively coupled to the base portion and arm portion and with the pedestal adjacent the base portion being secured to the base plate, an amplifying lever pivoted to the base plate along one edge thereof, said amplifying lever having a short arm and a long arm extending substantially at right angles to one another, indicating means including a rotatable spindle having a pointer and scale, the long arm of the lever having a thread which is wound about the spindle, the thread having a take-up spring anchored with respect to the base plate, the short arm of the lever being located squarely in the path of movement of the tip of the leaf spring so that movements thereof as the bellows expands and contracts produce amplified rotation at the spindle, the pedestal on the bellows which engages the arm portion of the spring having a narrow neck terminating in an enlargement, the arm portion of the spring having a keyhole-shaped opening for captive engagement of the neck of the pedestal, the arm portion of the spring being formed to provide upraised transversely alined projections adjacent the root of the keyhole opening defining a fulcrum between the bellows and spring.

8. In a barometer movement the combination comprising a flat base plate, a sealed bellows of disc shape having axial pedestals on the opposite sides thereof, a U-shaped leaf spring having a flat base portion and an elongated arm portion with a tip, said bellows being positioned within the leaf spring with the pedestals respectively coupled to the base portion and arm portion and with the pedestal adjacent the base portion being secured to the base plate, an amplifying lever pivoted to the base plate along one edge thereof, said amplifying lever having a short arm and a long arm extending substantially at right angles to one another, indicating means including a rotatable spindle having a pointer and scale, the long arm of the lever having a thread which is wound about the spindle, the thread having a take-up spring anchored with respect to the base plate, the short arm of the lever being located squarely in the path of movement of the tip of the leaf spring so that movements thereof as the bellows expands and contracts produce amplified rotation at the spindle, the bellows and leaf spring comprising an assembled unit, means including an elongated slot and threaded clamping element for clamping the base pedestal to the base plate in adjusted position thereby to provide a coarse adjustment of the effective length of the short arm on the lever, means including a deformable bridge on the base plate for mounting the lever, said deformable bridge having threaded means for deforming the same with respect to the base plate for fine adjustment of the effective length of the short arm on the lever.

9. In a barometer movement the combination comprising a flat base plate, a sealed bellows of disc shape having axial pedestals on the opposite sides thereof, a U-shaped leaf spring having a flat base portion and an elongated arm portion with a tip, said bellows being positioned within the leaf spring with the pedestals respectively coupled to the base portion and arm portion and with the pedestal adjacent the base portion being secured to the base plate, an amplifying lever pivoted to the base plate along one edge thereof, said amplifying lever having a short arm and a long arm extending substantially at right angles to one another, indicating means including a rotatable spindle having a pointer and scale, the long arm of the lever having a thread which is wound about the spindle, the thread having a take-up spring anchored with respect to the base plate, the short arm of the lever being located squarely in the path of movement of the tip of the leaf spring so that movements thereof as the bellows expands and contracts produce amplified rotation at the spindle, the pedestal on the bellows which engages the base portion of the leaf spring being seated on the base plate to provide a mounting for the leaf spring and an adjusting screw, threaded into the base plate, engaging the leaf spring at a point spaced from the mounting for the purpose of providing reference adjustment of the indicating means.

10. In a barometer movement the combination comprising a flat base plate, a sealed bellows of disc shape having axial pedestals on the opposite sides thereof, a bellows spring having an elongated arm with a tip, said bellows being positioned adjacent the spring arm, one pedestal being mounted on the base plate and the other pedestal engaging the spring arm for swinging movement of the arm in response to changes in atmospheric pressure, an amplifying lever pivoted to the base plate adjacent one edge thereof, said amplifying lever having a short arm extending generally parallel to the base plate, the spring arm having an elongated relatively sharp tip extending downwardly therefrom into engagement with the short arm of the lever, indicating means including a rotatable spindle having a pointer and scale arranged above the base plate, a long arm on the lever extending upwardly generally parallel to the elongated tip on the spring arm and mounting a thread which is wound about the spindle, the thread having a take-up spring anchored with respect to the base plate for accommodating movement of the thread and for simultaneously biasing the short arm of the lever against the tip of the spring arm, and means for varying the effective spacing between the lever axis and the centerline of the bellows for achieving accurate tracking of the pointer with respect to the graduations of the scale.

11. In a barometer movement the combination comprising a flat base plate, a sealed bellows of disc shape having axial pedestals on the opposite sides thereof, a bellows spring having an elongated arm with a tip, said bellows being positioned adjacent the spring arm, one pedestal being mounted on the base plate and the other pedestal engaging the spring arm for swinging movement of the arm in response to changes in atmospheric pressure, an amplifying lever pivoted to the base plate adjacent one edge thereof, said amplifying lever having a short arm extending generally parallel to the base plate, the spring arm having an elongated relatively sharp tip extending downwardly therefrom into engagement with the short arm of the lever, indicating means including a rotatable spindle having a pointer and scale arranged above the base plate, a long arm on the lever extending upwardly generally parallel to the elongated tip on the spring arm and mounting a thread which is wound about the spindle, the thread having a take-up spring anchored with respect to the base plate for accommodating movement of the thread and for simultaneously biasing the short arm of the lever against the tip of the spring arm, the thread being in the form of an endless loop secured to the spindle and encircling the same and hooked onto the end of the long lever arm and to the take-up spring.

12. The combination as caimed in claim 10 in which the elongated arm on the bellows spring is integral with the spring and has edges bent to form a channel cross section for rigidification of the arm along the length thereof.

13. The combination as claimed in claim 10 in which the means for varying the spacing includes a clampable sliding connector between the bellows and the base plate to provide a gross adjustment plus a threaded member reactively positioned with respect to the base plate to provide a fine adjustment.

References Cited

UNITED STATES PATENTS

| 1,664,417 | 4/1928 | Hunt | 73—386 |
|---|---|---|---|
| 2,178,027 | 10/1939 | Wright | 73—387 |
| 2,246,741 | 6/1941 | Loen | 73—387 |

FOREIGN PATENTS 900,411   10/1944   France.

LOUIS R. PRINCE, *Primary Examiner.*

D. E. CORR, *Assistant Examiner.*

U.S. Cl. X.R.

73—410